INVENTOR
WOLFGANG E. MEYER
ROBERT M. VIJUK

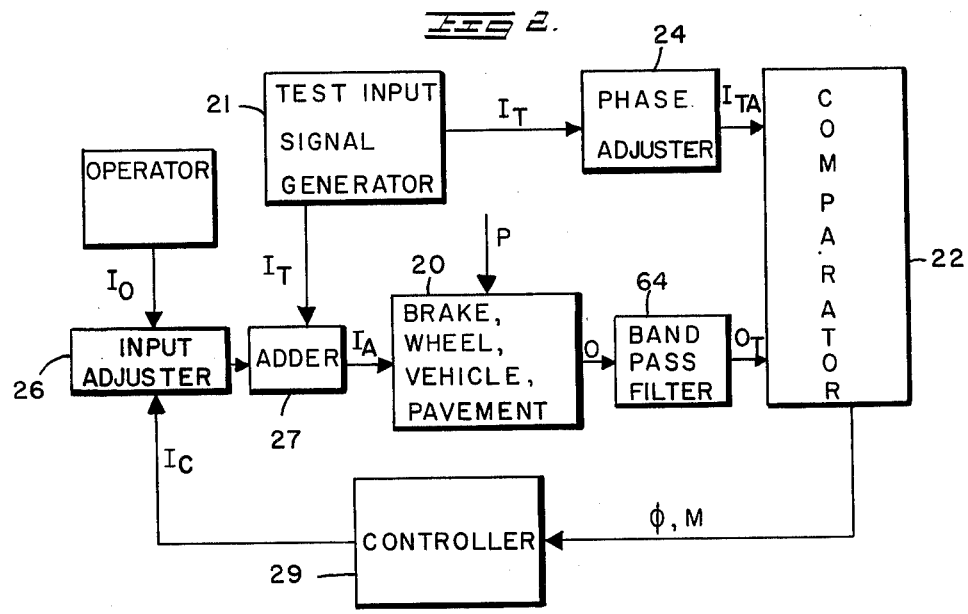

BY Stowell & Stowell
ATTORNEY

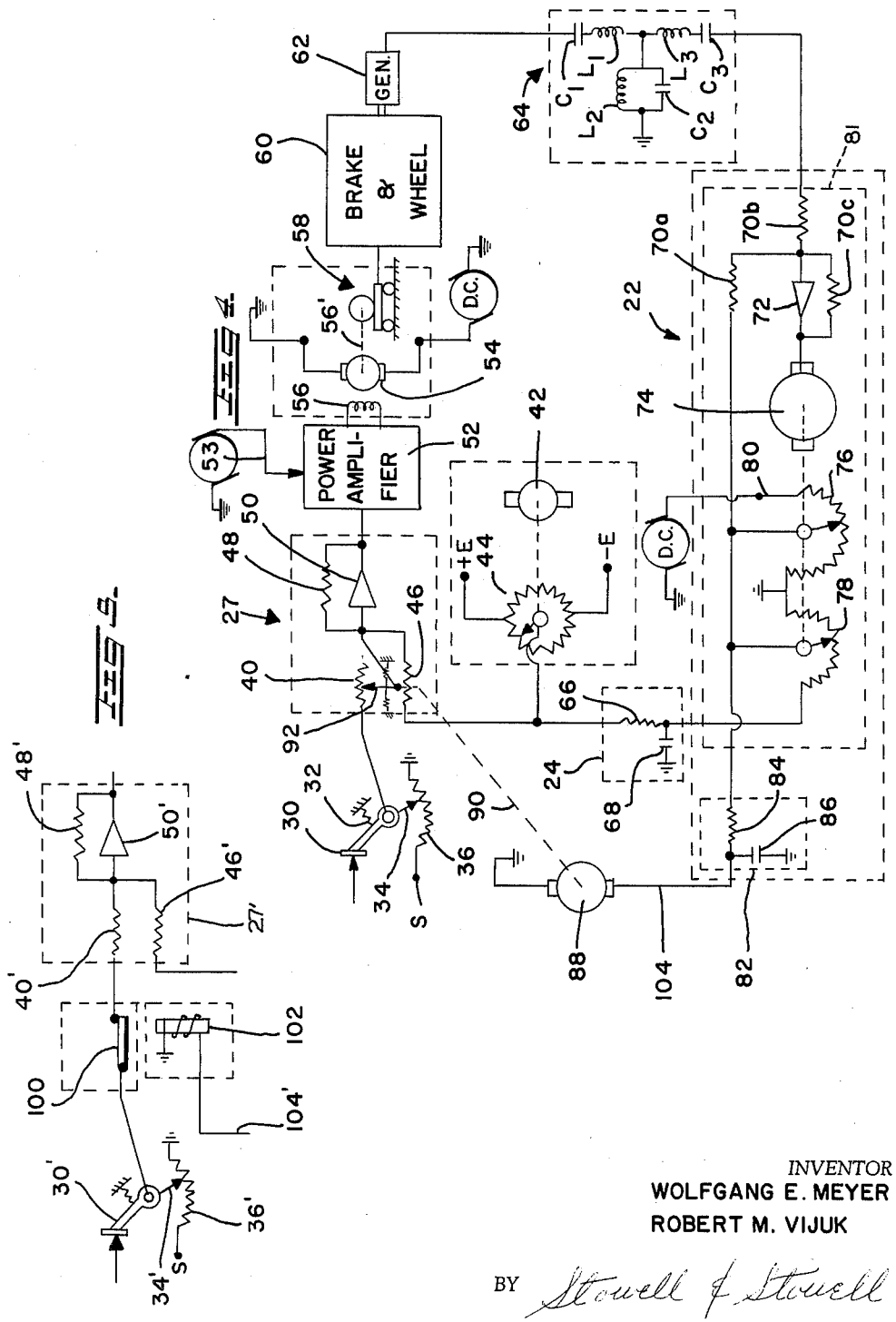

3,235,036
BRAKE CONTROL SYSTEM
Wolfgang E. Meyer and Robert M. Vijuk, State College, Pa., assignors to Research Corporation, New York, N.Y., a corporation of New York
Filed Oct. 31, 1962, Ser. No. 234,322
7 Claims. (Cl. 188—181)

This invention relates to improvements in vehicle brake control systems.

It is a primary object of the present invention to provide a system for controlling vehicle brakes cooperating with ground engaging wheels whereby the braking torque does not exceed a value corresponding to the point of "critical slip" between the wheels and the ground. "Critical slip" is the point where the frictional force between a wheel being braked and the surface engaging the wheel is at a maximum thus providing minimum stopping distance and maximum braking effectiveness with a minimum of tire wear and optimum control of the vehicle being braked. Applying braking torque corresponding to a value less than critical slip between the wheel being braked and the surface of engagement results in a greater stopping distance and applying braking torque corresponding to a value greater than critical slip will result in wheel lock, with its attendant maximum tire wear, increase in stopping distance and loss of directional control of the vehicle.

It is, therefore, an object of the present invention to provide a brake control system wherein the operator of the vehicle may maintain the braking torque at or in the near vicinity of the point of critical slip which typically varies as the vehicle is brought to a stop.

A further object is to provide such a system wherein automatic control of the brakes may occur only when the operator applies emergency braking torque, i.e., desires a minimum stopping distance.

Another object is to provide a brake control system which will maintain braking torque substantially at the point of critical slip between the wheels of the vehicle and their surface of engagement regardless of the condition of the roadway, tires of the vehicle or the like.

A further object is to provide such a system that is relatively simple and employs as its components conventional electrical, electronic, hydraulic or mechanical mechanisms or combinations thereof.

It is another object of the present invention to provide a brake control system that does not require complex computer mechanism, fifth wheels or the like commonly employed in prior art automatic braking systems.

These and other objects and advantages of the present invention are provided in a system for controlling the braking torque of friction brakes cooperating with ground engaging wheels whereby the braking torque is prevented from exceeding a value corresponding to the point of critical slip between the wheels and the ground including brake applying means, means for generating an oscillatory control signal, means for generating an oscillatory signal varying with the effect of the braking force on the object to be braked, means for comparing the oscillatory signal and the oscillatory control signal, and means responsive to the output of the comparing means for adjusting the brake applying means at least when the output of the comparator corresponds to a value exceeding the point of critical slip between the wheels and the ground.

The invention will be more particularly described with reference to the accompanying drawings wherein:

FIG. 1 is a schematic block diagram of a physical system suitable for control by the system of the invention;

FIG. 2 is a simplified block representation of a closed loop control system of the invention;

Figure 3A:
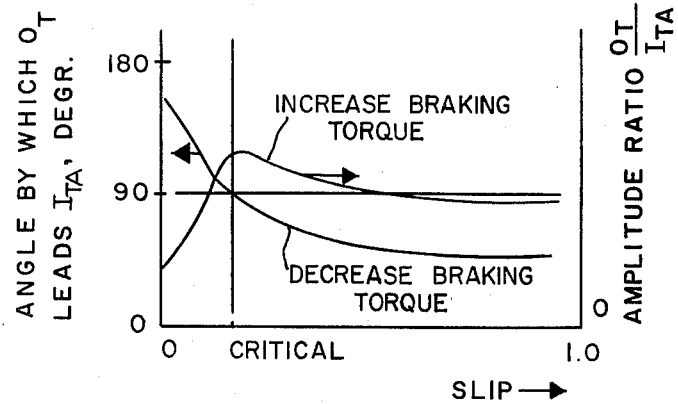

FIGS. 3A, B and C are charts showing the relationships between the phase lead angle and the amplitude ratio of an oscillatory control signal and a signal derived from wheel speed, wheel acceleration, and the frictional force between a vehicle wheel and the pavement;

FIG. 4 is a schematic diagram of an embodiment of the present invention wherein the braking torque is maintained substantially at a value corresponding to critical slip; and FIG. 5 is a fragmentary view of the schematic diagram shown in FIG. 4 modified to maintain the braking torque at the point corresponding to critical slip only when maximum braking torque is applied by the operator.

Automatic control of braking is desirable due to the nature of the frictional force developed between a tire and its supporting surface. The coefficient of friction between a tire and a road surface is, in general, a function of wheel slip, that is, the ratio of difference between the vehicle velocity and the tire velocity to the vehicle velocity. It has been found that under substantially all braking conditions, there is a braking torque which will provide maximum braking effectiveness, minimum tire wear and optimum operator control; this point is designated herein as the point of critical slip. At the point of critical slip, the vehicle being braked experiences maximum deceleration and comes to rest in a minimum distance. When the braking torque applied corresponds to wheel slip beyond critical slip, the wheels decelerate rapidly and lock, while the vehicle decelerates at a lesser rate due to the reduced coefficient of friction at slips greater than critical slip and the vehicle stopping distance is therefore increased.

Tests have also shown that when the braking torque corresponds to slips less than critical slip, control of the vehicle is readily maintained; however, the stopping distance with lower braking torques is substantially greater than the stopping distance corresponding to the application of braking torque effective to maintain the coefficient of friction between the tire and the road surface at the point corresponding to critical slip. Therefore, when minimum stopping distances are desired, all the wheels of the vehicle should operate at or in the near vicinity of the point of critical slip. However, when brake operation is under the control of the vehicle operator, one or more wheels are likely to become locked when the operator desires to stop the vehicle in a minimum stopping distance, thus increasing the stopping distance and also causing a loss of directional control of the vehicle. Because the coefficient of friction and the point of critical slip change with speed, temperature, tire contact area, local conditions of the road surface and tire condition, it is substantially impossible for an operator to bring a vehicle to rest in the minimum stopping distance.

In view of the complexity involved in providing the quickest possible stop and the serious consequences resulting when wheels of a vehicle lock, a number of antilock or anti-skid braking systems have been proposed for use on aircraft, trains and road vehicles. Substantially all of these systems are of the "on" and "off" type and are basically acceleration sensitive; that is, they function by releasing the brakes when a predetermined wheel deceleration is exceeded and by re-applying the brakes when the relative wheel speed again approaches the vehicle speed. Such systems can perform ideally only under the one condition for which they are preset and they cannot provide adequate performance under the varying conditions typically encountered by road vehicles and landing aircraft.

Referring to FIG. 1, there is illustrated a block diagram representing a wheeled vehicle during braking. $I_A$ is the actuating input which is impressed on the braking system generally designated 10. $I_A$ may be a mechanical, hydraulic, pneumatic or electrically generated force or a combination thereof. The actuating input $I_A$ results in a braking torque $T_B$ through its contact with the brake disc 12 having an angular velocity $\omega$. The braking torque $T_B$ and the frictional force F developed between the tire and pavement both act on the wheel 14 of the vehicle 16 to produce an angular acceleration of the wheel $d\omega/dt$ and a corresponding change in angular velocity of the wheel $\omega$. The frictional force F between the tire and pavement also results in an acceleration of the vehicle $dV/dt$ and a corresponding change in vehicle velocity V.

A further component of the system is represented by the block 18, wherein the relation between the frictional force F developed between the tires and pavement and the wheel velocity $\omega$, vehicle velocity V, and type of pavement P is shown. The types of pavement $P_1$, $P_2$, $P_3$ or $P_4$ represent a portion of the system that cannot be controlled. In the block 18 representing the pavement which, together with the wheel, determines the frictional characteristics of the system, the chart showing the frictional forces with varying pavement conditions $P_1$, $P_2$, $P_3$, and $P_4$ indicates that wheel slip may vary at different points on the same pavement or at different times on the same pavement under different weather conditions.

To provide a closed loop control system one or more of the variables having a relationship to the performance of the system must be physically measurable. It has been determined that several variables are available as output signals from a braking vehicle. A discussion of the instrumentation necessary for the measurement of these variables and its suitability for use in the present invention follows.

(1) The braking torque $T_B$ is readily measurable on a vehicle equipped with any of the conventional forms of friction brakes. For example, if the vehicle is equipped with disc or drum brakes, the portion of the braking system containing the brake pads or shoes may be mounted for angular rotation about an axis parallel to the axis of the wheel. By restraining the rotation of the brake pads or shoes and measuring the restraining force, a force proportional to the braking torque is obtained. Any conventional load sensing devices may be incorporated in the restraining member to provide a signal representing this braking torque.

(2) The angular velocity $\omega$ of the wheel of the vehicle is readily measurable by means of a tachometer generator coupled to the rotating wheel.

(3) The angular acceleration $d\omega/dt$ is a determinable quantity and may be measured most simply by an accelerometer carried on the rim of the wheel with its sensitive axis tangent to a circle concentric to the wheel axis. A signal representing the angular acceleration of the wheel may also be obtained by differentiating the angular velocity of the wheel through a suitable computing circuit. However, in view of the additional cost of providing a computing network for the angular wheel acceleration and the ease of obtaining the angular acceleration and other of the measurable quantities by simple electrical measuring devices, computer measurements of angular wheel acceleration would not comprise a preferred embodiment of the present invention.

(4) Measurement of the vehicle velocity V requires a freely rolling wheel mounted for no slip between the wheel and the pavement and, in most vehicles, and, in particular, in aircraft, the requirement of an additional wheel renders measurement of the vehicle velocity undesirable in carrying out the objectives of the present invention.

(5) Direct measurement of the frictional force F developed between the wheel tire and the pavement requires the installation of load sensing elements in the vehicle suspension system that are sensitive to only the frictional force. Because of the complexity of modern wheel suspension systems, this method of measurement is not considered to be feasible. However, the frictional force may be computed with a simple electronic analog computer from the angular acceleration of the wheel and the braking torque referred to above. The electronic computation is relatively simple as the only necessary operations are "scaling," that is, multiplication by a constant and addition.

(6) Vehicle acceleration $dV/dt$, while measurable, is not particularly suited for the present system. The brake control system providing for minimum stopping distance and prevention of wheel locking must control each wheel individually whereas the vehicle deceleration reflects the effect of all the wheels during braking and does not indicate the performance of an individual wheel.

As will be discussed later, wheel speed, wheel acceration and frictional force provide measurable output signals which may readily be used to indicate the performance of the braking system and thus serve as a basis to control the braking torque to maintain wheel slip at or about the critical point. Further, as will be more apparent hereinafter, the control system for the brakes may employ any one or more of the signals derived from the wheel speed, wheel acceleration or frictional force with only minor differences in the function of the components of the control system.

Since any one of the several measurable output signals from the system such as wheel speed, wheel acceleration and frictional force may be used to control the braking torque to main critical slip, the control system of the invention may be simply illustrated by the block diagram shown in FIG. 2 wherein a signal $I_O$ corresponding to the force applied by the operator to provide a braking torque is directed first through an input adjuster 26 and then to an adder 27. Initially the signal representing the braking torque applied by the operator is unaffected in the input adjuster and is only modified therein if the braking torque for the wheel to be controlled provides wheel slip that is greater or less than the critical wheel slip.

The operator's input signal $I_O$ is algebraically added in adder 27 to an oscillatory test input signal $I_T$ from the test input signal generator 21. It has been found that a sinusoidal alternating wave form will provide a satisfactory oscillatory test input signal. The test input signal is preferably of a constant amplitude and at a frequency selected to produce a component of the output signal which can be distinguished from "noise" in the output signal. The adder produces an input actuating signal $I_A$ composed of the operator's input signal $I_O$ with a comparatively small signal $I_T$ from the test input generator superimposed therein. The input actuating signal $I_A$ through suitable actuating means applies a braking force to the wheel, indicated by box 20. The effect of the component of the input actuating signal $I_A$ due to oscillatory test signal $I_T$ on the braking force applied to the wheel is small compared to the effect due to operator's input signal $I_O$ but is sufficient to introduce an oscillatory component into the rate of angular deceleration of the wheel. The braking torque $T_B$ results in an output signal O which may correspond to or be derived from wheel speed, wheel acceleration or frictional force. The output signal O is composed of a large component brought about by the operator's input signal $I_O$ and smaller oscillatory components created by the relatively small test input signal $I_T$. It will be recognized that there will be a component of the output signal O caused by the test input signal that will be of the same frequency as the test input signal but will differ in phase and in amplitude from the test input signal by amounts related to the varying rates of angular deceleration of the wheel. The output signal O representing the effect of the braking torque on the vehicle is passed to a band pass filter 64 adapted to remove the component of the output signal O caused by the operator's signal $I_O$ and to pass to the comparator 22 the component of the output signal O caused by and of the same frequency as the test input signal $I_T$. The output from the band pass filter $O_T$ passed to the comparator 22 is therefore a sinusoidal signal of the same frequency as the test input signal $I_T$ but of an amplitude that differs from the test input signal and which is out of phase with the test input signal. The test input signal generator 21 also passes an identical signal $I_T$ to a phase adjuster 24 which shifts the phase of the test input signal $I_T$ by a predetermined amount equal to the phase shift of the test input signal caused by the brake applying means, the adder and the band pass filter, so that the comparator 22 receives a phase adjusted test input signal $I_{TA}$ and an adjusted output signal $O_T$. The comparator 22 measures the difference in the phase angle between the phase adjusted test input signal $I_{TA}$ and the filtered output signal $O_T$ and emits a signal $\phi$ in accordance with its findings. The comparator may also measure the amplitude variation between the filtered output signal and the phase adjusted test input signal and emit a signal M. The output signal or signals from the comparator is passed to the controller 29 which produces a control signal $I_C$ which is passed to the operator's input signal adjuster 26 to either increase or decrease the signal as the case may be to either prevent wheel locking or increase the braking torque to maintain wheel slip at the critical point.

The form of the comparator and the controller of the system illustrated in FIG. 2 would depend on the nature of the output signal $O_T$ from the band pass filter as the phase and amplitude relations that exist between the filtered signal passing to the comparator 22 and the phase corrected test signal $I_{TA}$ determine the system's performance and the means to correct the performance to the desired state.

FIG. 3A illustrates the relationship which exists between the phase lead angle, the amplitude ratio and slip where the output signal from the band pass filter is derived from the wheel speed. From an examination of FIG. 3A, it will be seen that the comparator measures the phase lead angle and emits a signal to the controller to increase the braking torque if the phase lead angle is greater than 90° or to release the braking torque if the phase lead angle is less than 90°. It will also be noted that either the magnitude of the deviation of the phase lead angle from 90° or the amplitude ratio $O_T/I_{TA}$ may be employed to determine the extent of the correction required to maintain the braking system at the point of critical slip.

Figure 3B:
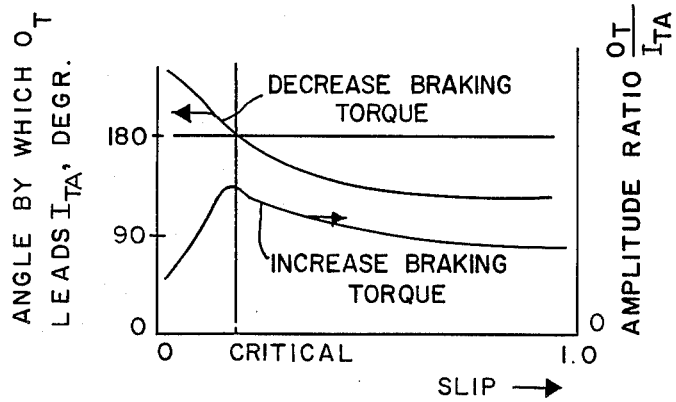

FIG. 3B illustrates the relation which exists between phase angle, the amplitude ratio and slip, where the output signal is derived from the wheel acceleration. The function of the comparator and the controller of FIG. 2 would operate in a manner as described with reference to FIG. 3A except that the phase lead angle of 180° corresponds to the critical point and the comparator would compare the phase lead angle to 180° rather than to 90°.

Figure 3C:
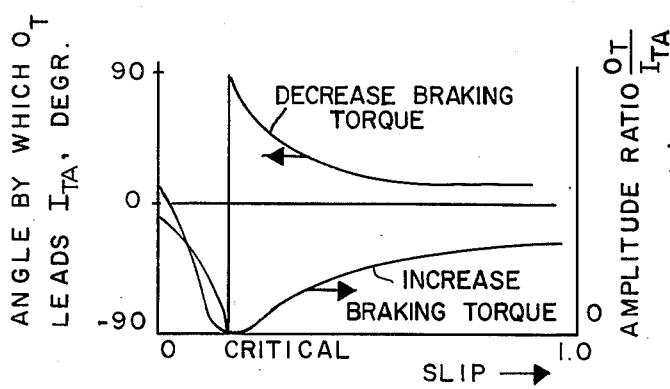

FIG. 3C illustrates the relations which exist between the phase angle, the amplitude and slip, where the frictional force between the tire and pavement is the output signal. From FIG. 3C it will be seen that the braking torque should be increased when the phase angle is negative and the braking torque should be decreased when the phase angle is positive. It will also be noted that either the phase angle or the amplitude ratio can be used to determine the magnitude of the desired correction to maintain the braking torque at the point of critical slip.

Referring to FIG. 4 of the drawings, there is shown a specific embodiment of the application of the principles of the present invention employing wheel speed as the control parameter, the phase of which, as described with reference to FIG. 3A, will lead the phase corrected test input signal by 90° if no further braking torque is to be applied to the system. In FIG. 4 only a single signal is produced in the comparator and passed to the controller and the system contains only electrical and mechanical components of conventional designs which components may be replaced by analogous pneumatic and hydraulic components. The operator of the vehicle depresses the brake pedal 30, biased in the brake "off" position by spring means 32, and moves the arm 34 of the potentiometer 36 whereby a corresponding D.C. voltage from a source S is passed to the variable resistor 40 of the adder 27. At the same time the constant speed motor 42 drives the test input signal generator 44 to produce a sinusoidal voltage which is passed to the resistor 46 of the adder. This voltage is coupled in the added 27 to the D.C. generated voltage. The adder includes a further resistor 48 and the high gain amplifier 50. The output voltage of 27 is supplied to a conventional power amplifier 52 connected to a power supply 53. The power amplifier 52 supplies a current to the field coils 56 of the direct current servo motor 54 such that the field current is proportional to the input voltage to the amplifier. The armature of the servo motor 54 designated 56' is connected to, for example, rack and pinion means generally designated 58 which exert a brake actuating force on the wheel and brake means represented by block 60. A small wheel carried direct current tachometer generator 62 produces a voltage proportional to the speed of rotation of the wheel. The assembly of servo motor 54, rack and pinion means 58, and amplifier control field coils 56 for the motor 54 is so arranged that if the supply current to the armature of the motor is held constant, the torque developed by the motor will be proportional to the field current.

The output voltage signal from the tachometer generator 62 is filtered by the band pass filter generally designated 64, which comprises capacitors $C_1$, $C_2$, and $C_3$ and inductors $L_1$, $L_2$, and $L_3$. Only the oscillatory component of the signal from the tachometer generator 62 that is at the frequency of the signal generated by the test input signal generator 44 is permitted to pass through the filter.

The output voltage from the band pass filter 64 is coupled to the comparator 22 composed of multiplier 81 and low pass filter 82. The test input signal from generator 44 is also coupled to the comparator 22 through phase adjuster 24. The phase adjuster 24 comprises resistor 66 and capacitor 68 and as hereinbefore discussed, the phase adjuster changes the phase of the test input signal by a predetermined angle equal to the phase shift which occurs in the signal in the adder, power amplifier, servo motor and the band pass filter. The comparator 22 multiplies the output signal from the phase adjuster 24 and the signal from band pass filter 64 by means of resistors 70a, b and c, high gain voltage amplifier 72, motor 74 and the pair of potentiometers 76 and 78 connected to a direct current power supply through lead 80.

The comparator 22, comprised of a multiplier 81 and a low pass filter 82, is supplied with inputs from the band pass filter 64 and phase adjuster 24. Both of these input signals (voltages) are sinusoidal and of the same frequency, but out of phase by an angle whose magnitude is related to the operating condition of the wheel, i.e., whether slip is greater than or less than zero. Multiplying these signals together results in a signal made up of two components.

(1) A direct component whose magnitude is the product of the two input signal magnitudes and the cosine of the phase angle between the two, and (2) An oscillatory component of twice the frequency of the input signals.

The output from the multiplier 81 is passed through a low-pass filter 82 comprised of resistance 84 and capacitor 86. After filtering this product signal in the low pass filter 82 only component (1) above remains as the output of the comparator. Because of the relation of this direct component (1) to the cosine of the phase angle, the output will be of positive polarity for phase angles between zero and 90° and of negative polarity for phase angles between 90° and 180°. Therefore, the output signal from the comparator will be a positive direct voltage when slip is greater than critical and a negative direct voltage when slip is less than critical.

The output from the low-pass filter is impressed on a reversible direct current servomotor 88, the output shaft 90 of which actuates a center biased contact arm 92 of the variable resistor 40 whereby the voltage from the potentiometer 36 is either increased or decreased, depending on the polarity of the current directed to the reversible servomotor 88. The polarity will be negative if the phase difference between the signals entering the multiplier are between 90° and 180° indicating that wheel slip is less than critical and positive if the phase difference is between 0° and 90° indicating that wheel slip is greater than critical.

If the brake control system is of the type wherein control action is to be applied only in the case when wheel slip exceeds the critical slip, the form of the adder 27 and the use of the signals from the comparator 22 would be modified as illustrated in FIG. 5. Referring to FIG. 5, the brake control pedal 30' is spring-biased in the "off" direction and the pedal actuates the movable arm 34' of the potentiometer 36'. The output from the potentiometer passes through a normally closed solenoid actuated switch means 100. From the switch 100 the voltage from the potentiometer 36' passes to fixed resistance 40' of the adder 27' which also includes resistance 46', high gain voltage amplifier 50' and resistance 48'. The test input signal as described with reference to FIG. 4 is connected to the adder through the resistance 46'. The input to the solenoid 102 for actuating the normally closed switch 100 is connected by lead 104 to the output from the low pass filter 82 whereby when the phase difference from the comparator is between 0° and 90° indicating wheel slip greater than critical, the solenoid 102 is energized by a direct current voltage of positive polarity, opening switch 100 to release completely the torque applied to the wheel brakes. The brakes will be relieved until the wheel slip returns to a point less than critical, at which point the driver will regain control as switch 100 is closed. If the operator maintains a sufficient braking thrust on the brakes, the brakes will cycle on and off with the wheel slip cycling about the critical point. It will be noted that with the system illustrated in FIG. 5, during moderate braking the control system will not take effect and the driver of the vehicle will have full braking control.

From the foregoing description of the present invention, it will be seen that the objects and advantages hereinbefore set forth are fully accomplished and that a fully automatic or a semi-automatic brake control system is provided which will maintain braking torque at a value not exceeding the point of critical slip of a vehicle wheel.

The two specific control systems disclosed with reference to FIGS. 4 and 5 of the drawings are illustrative only of the principles of the invention and the illustrated structures may be variously modified to suit particular brake control problems. For example, in the system illustrated in FIG. 4 which provides continuous control of wheel slip to the critical value as soon as the brakes are operated is particularly suitable for application in aircraft where nearly every stop must be executed in a minimum stopping distance, the brake pedal 30 and the potentiometer 36 may be replaced by a switch. When "on" the switch would apply a voltage to the resistor 40 of the adder 27 from the source S and the controller would then control the brakes maintaining the braking torque at a value corresponding to critical slip until the vehicle comes to rest.

We claim:

1. A system for controlling the braking torque of friction brakes cooperating with a ground engaging wheel whereby the braking torque is prevented from exceeding a value corresponding to the point of critical slip between the wheel and the ground including brake applying means, means for generating an oscillatory control signal, means for modulating a portion of said oscillatory control signal to generate an oscillatory signal varying with the effect of the braking force on the wheel to be braked, means for comparing the oscillatory signal and the oscillatory control signal, and means responsive to the output of the comparing means for adjusting the brake applying means at least when the output of the comparator corresponds to a value exceeding the point of critical slip between the wheel and the ground.

2. A system for controlling the braking torque of friction brakes cooperating with the ground engaging wheel whereby the braking torque is prevented from exceeding a value corresponding to the point of critical slip between the wheel and the ground including brake applying means, means for generating an oscillatory control signal, means for generating an oscillatory signal varying with the effect of the braking force on the wheel to be braked, means for comparing at least the phase relation between the oscillatory signal and the oscillatory control signal, and means responsive to the output of the comparing means for adjusting the brake applying means to maintain the braking torque in response to the output of the comparator to maintain the slip between the wheel and the ground at the point of critical slip.

3. A system for controlling the braking torque of friction brakes cooperating with a ground engaging wheel whereby the braking torque is prevented from exceeding a value corresponding to the point of critical slip between the wheel and the ground including brake applying means, means for generating a first signal varying with the brake applying force, means for generating an oscillatory control signal, means for generating an oscillatory signal varying with the effect of the braking force on the wheel to be braked, means for comparing the oscillatory control signal and the oscillatory signal varying with the effect of the braking force on the object to be braked, and means for varying said first signal in response to the output of the comparing means for adjusting the brake applying means at least when the output of the comparator corresponds to a value exceeding the point of critical slip between the wheel and the ground.

4. A system for controlling the braking torque of friction brakes cooperating with a ground engaging wheel whereby the braking torque is prevented from exceeding a value corresponding to the point of critical slip between the wheel and the ground including brake applying means, means for generating a first signal varying with the brake applying force, means for generating an oscillatory control signal, means for generating an oscillatory signal varying with the effect of the braking force on the wheel to be braked, means for comparing the oscillatory control signal and the oscillatory signal varying with the effect of the braking force on the object to be braked, and means responsive to the output of the comparing means for maintaining the first signal at a value corresponding to the point of critical slip between the wheel and the ground.

5. The invention defined in claim 4 wherein the oscillatory signal varying with the effect of the braking force on the wheel to be braked is derived from the wheel speed.

6. The invention defined in claim 4 wherein the oscillatory signal varying with the effect of the braking force on the wheel to be braked is derived from the angular acceleration of the wheel being braked.

7. The invention defined in claim 4 wherein the oscillatory signal varying with the effect of the braking force on the wheel to be braked is derived from the frictional force between the wheel and the ground surface engaged thereby.

References Cited by the Examiner

UNITED STATES PATENTS 2,277,035   3/1942   Canetta et al. _____ 303—21
2,907,607  10/1959   Williams _____ 188—181 X MILTON BUCHLER, *Primary Examiner.*

ARTHUR L. LA POINT, EUGENE G. BOTZ,
*Examiners.*